(12) United States Patent
Rizzo et al.

(10) Patent No.: US 8,166,321 B2
(45) Date of Patent: *Apr. 24, 2012

(54) METHOD AND APPARATUS TO ADAPT THE CLOCK RATE OF A PROGRAMMABLE COPROCESSOR FOR OPTIMAL PERFORMANCE AND POWER DISSIPATION

(75) Inventors: Davide Rizzo, San Diego, CA (US); Osvaldo Colavin, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 685 days.

This patent is subject to a terminal disclaimer.

(21) Appl. No.: 12/150,386

(22) Filed: Apr. 28, 2008

(65) Prior Publication Data

US 2008/0201590 A1 Aug. 21, 2008

Related U.S. Application Data

(63) Continuation of application No. 10/284,006, filed on Oct. 30, 2002, now Pat. No. 7,366,932.

(51) Int. Cl.
*G06F 1/32* (2006.01)
(52) U.S. Cl. ........................................................ 713/322
(58) Field of Classification Search .................. 710/322; 713/320–322
See application file for complete search history.

(56) References Cited

U.S. PATENT DOCUMENTS

| | | | |
|---|---|---|---|
| 5,761,468 A | 6/1998 | Emberson | |
| 5,933,643 A * | 8/1999 | Holler | 717/158 |
| 5,959,431 A | 9/1999 | Xiang | |
| 6,026,479 A | 2/2000 | Fisher et al. | |
| 6,307,281 B1 | 10/2001 | Houston | |
| 6,317,840 B1 * | 11/2001 | Dean et al. | 713/320 |
| 6,330,703 B1 | 12/2001 | Saito et al. | |
| 6,519,707 B2 | 2/2003 | Clark et al. | |
| 6,834,354 B1 | 12/2004 | Togawa | |
| 6,874,098 B2 * | 3/2005 | Tamemoto et al. | 713/500 |
| 2003/0066061 A1 | 4/2003 | Wu et al. | |
| 2003/0084433 A1 | 5/2003 | Luk et al. | |
| 2003/0088864 A1 | 5/2003 | Tirumalai et al. | |
| 2004/0221281 A1 | 11/2004 | Suganuma | |

FOREIGN PATENT DOCUMENTS

| | | |
|---|---|---|
| EP | 1 182 571 A2 | 2/2002 |
| JP | 09022318 A * | 1/1997 |
| JP | 11296252 | 10/1999 |

OTHER PUBLICATIONS

Daniel Mosse, et al., "Compiler-Assisted Dynamic Power-Aware Scheduling for Real-Time Applications," Department of Computer Science, University of Pittsburgh, Pittsburgh, PA 15260, XP-002380997, Oct. 2000, 9 pages.

Chung-Hsing Hsu, et al, "Compiler-Directed Dynamic Frequency and Voltage Scheduling," Department of Computer Science, Rutgers University, Piscataway, New Jersey, XP-002380999, 17 pages.

Chung-Hsing Hsu, et al., "Compiler-Directed Dynamic Voltage/Frequency Scheduling for Energy Reduction in Microprocessors," XP-002380998, 4 pages.

* cited by examiner

*Primary Examiner* — Paul R Myers

(57) ABSTRACT

A coprocessor executing one among a set of candidate kernel loops within an application operates at the minimal clock frequency satisfying schedule constraints imposed by the compiler and data bandwidth constraints. The optimal clock frequency is statically determined by the compiler and enforced at runtime by software-controlled clock circuitry. Power dissipation savings and optimal resource usage are therefore achieved by the adaptation at runtime of the coprocessor clock rate for each of the various kernel loop implementations.

20 Claims, 2 Drawing Sheets

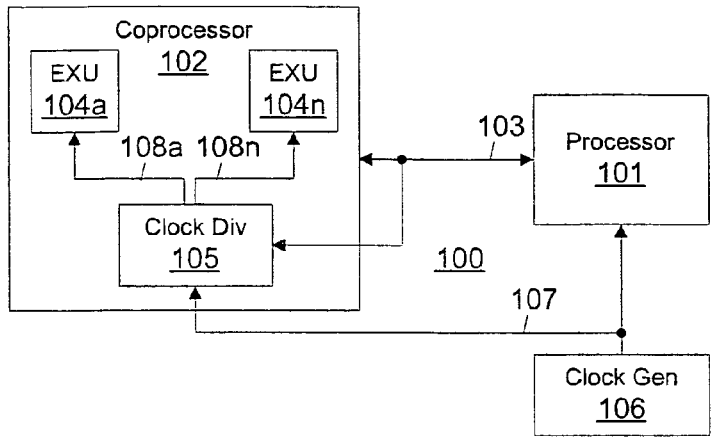
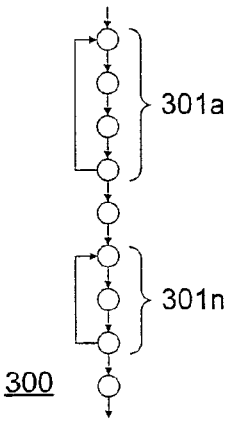
FIGURE 1
FIGURE 3
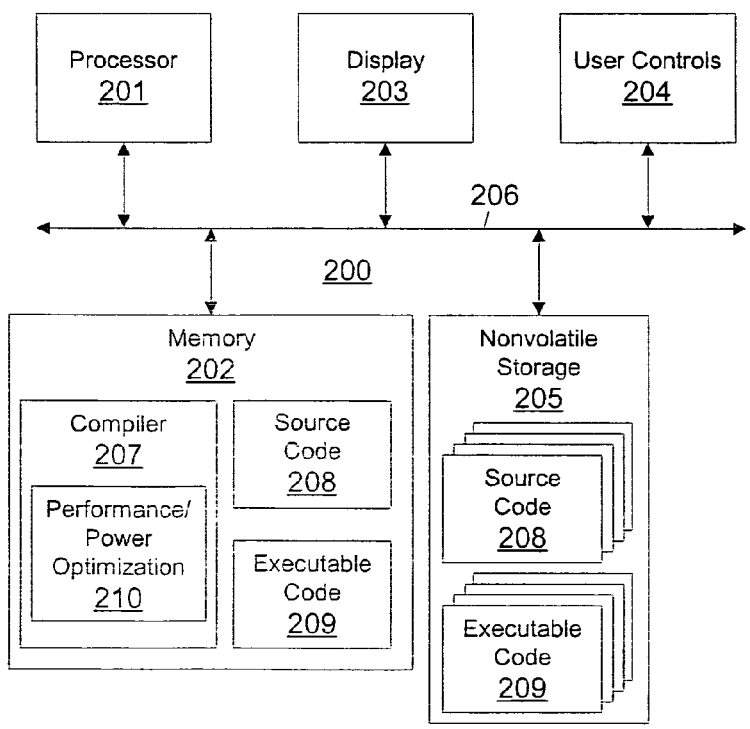
FIGURE 2

METHOD AND APPARATUS TO ADAPT THE CLOCK RATE OF A PROGRAMMABLE COPROCESSOR FOR OPTIMAL PERFORMANCE AND POWER DISSIPATION

CROSS-REFERENCE TO RELATED APPLICATION(S)

This application claims priority as a continuation of prior application Ser. No. 10/284,006 filed on Oct. 30, 2002 now U.S. Pat. No. 7,366,932, and which is incorporated herein by reference.

TECHNICAL FIELD OF THE INVENTION

The present invention is directed, in general, to improving processor performance and, more specifically, to reducing processor power dissipation through compiler-directed static clock rate control within a programmable coprocessor.

BACKGROUND OF THE INVENTION

In some applications, power consumption by a processor is an important consideration. For instance, power consumption may be a significant concern in Customer Premises Equipment (CPE) for an Advanced Digital Subscriber Line (ADSL) communications link Dowered through a Universal Serial Bus (USB) connection, where the power available through the USB connection is constrained.

Apart from low power design techniques employed at the circuit level, runtime power saving within processors has been addressed through either frequency/voltage scaling or circuit shutdown. Both approaches rely on monitoring circuits and control software added to the processor to collect runtime information and identify idle periods in processor activity during which any change is triggered. Transmeta LongRun and Intel SpeedStep are examples of voltage/frequency scaling adopted in commercial processors.

In such systems, the monitoring activity necessary to perform the dynamic analysis represents a hardware and software overhead, consuming silicon area, processor cycles and program memory, and itself contributing to the overall processor power dissipation.

There is, therefore, a need in the art for a voltage and/or clock frequency scaling technology for a programmable platform that inherently gives power optimization gains without requiring the addition of monitoring circuitry and software.

SUMMARY OF THE INVENTION

To address the above-discussed deficiencies of the prior art, it is a primary object of the present invention to provide, for use in a programmable processing system, a coprocessor executing one among a set of candidate kernel loops within an application at the minimal clock frequency satisfying schedule constraints imposed by the compiler and data bandwidth constraints. The optimal clock frequency is statically determined by the compiler and enforced at runtime by software-controlled clock circuitry. Power dissipation savings and optimal resource usage are therefore achieved by the adaptation at runtime of the coprocessor clock rate for each of the various kernel loop implementations.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property Or, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 1 depicts a processing system in which optimized performance/power dissipation execution is employed according to one embodiment of the present invention;

FIG. 2 depicts a processing system generating optimized performance/power dissipation application code according to one embodiment of the present invention;

FIG. 3 is a diagram of an application instruction flow to which optimized performance/power dissipation execution is applied according to one embodiment of the present invention.

DETAILED DESCRIPTION OF THE INVENTION

Figure 4:
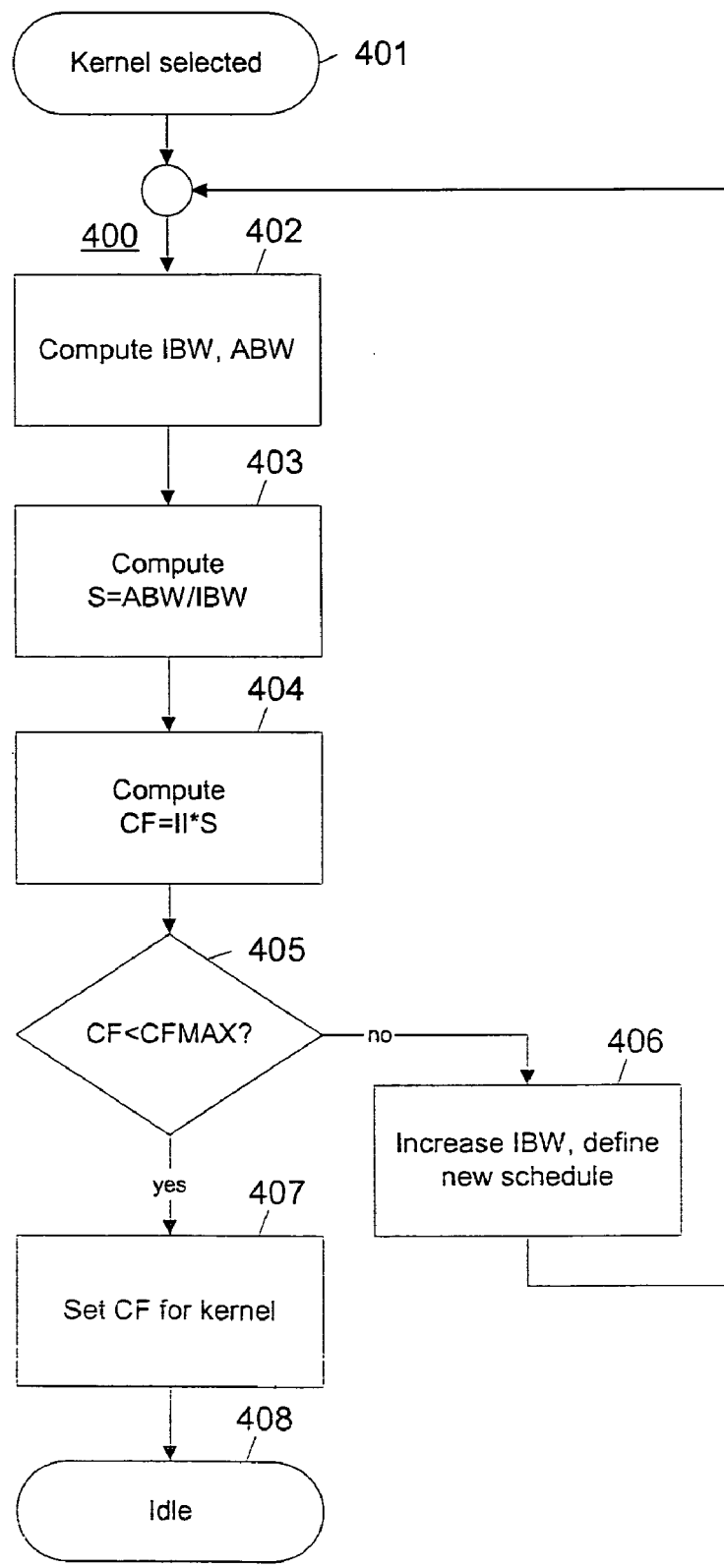
FIG. 4 is a high level flowchart for a process of deriving an optimal coprocessor performance/power dissipation clock rate according to one embodiment of the present invention.

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a processing system in which optimized performance/power dissipation execution is employed according to one embodiment of the present invention. Processing system 100 in the exemplary embodiment executes a program and includes a general-purpose processor 101 communicably coupled to a coprocessor 102 via communication mechanism 103 (e.g., a set of signal lines between a data unit within processor 101 and coprocessor 102). Processor 101 transmits instructions and operand data to the coprocessor 102 via communication mechanism 103 for execution by the coprocessor 102, and receives (or retrieves) results of such instructions from the coprocessor 102.

The main clock signal 107 driving the processing system 100 is generated by a clock generator 106. The clock signal(s) 108a-108n driving execution unit(s) 104a-104n within coprocessor 102 is derived in turn from the main clock signal 107 by a clock divider 105 under the control of processor 101.

In the exemplary embodiment, coprocessor 102 executes computational and data intensive loops in the application code for the program executed by the processing system 100. These computational and data intensive loops represent a significant portion of the overall program execution time when carried out through the general-purpose architecture of processor 101. The coprocessor 102 may optionally feature a runtime reconfigurable fabric where customized datapaths and communication links may be configured to better match the application requirements. The goal is to provide performance (execution speed and power dissipation) comparable to hardwired solutions while retain in a programmable approach. Coprocessor 102 may be implemented in accordance with the teachings of U.S. patent application Ser. No. 10/301,372 entitled "CLUSTERED VLIW COPROCESSOR WITH RUNTIME RECONFIGURABLE INTER-CLUSTER BUS" and filed Nov. 21, 2002, which is incorporated herein by reference.

FIG. 2 depicts a processing system generating optimized performance/power dissipation application code according to one embodiment of the present invention. Processing system 200 generates application code for execution on processing system 100 depicted in FIG. 1. Processing system 200 includes: at least one processor 201; memory 202, which may include read only memory (ROM), random access memory (RAM), cache memory, graphics card memory, etc.; at least one display 203; user controls 204, such as a keyboard and a mouse, trackball or similar device; and nonvolatile storage 205, such as a hard disk drive (either local or on a remote network node) as well as, optionally, a read-write optical disk drive.

Processor 201, memory 202, display 203, user controls 204 and nonvolatile storage 205 are all coupled by an interconnect 206, such as one or more buses and/or a network connection, which may be a local area network (LAN) connection, an Internet connection, or both, and are interoperable. Data processing system 200 is constructed and operates according known techniques, including a basic input/output system (BIOS) and operating system (OS), and one or more applications or user programs.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 200 may conform to any of the various current implementations and practices known in the art.

In the present invention, data processing system 200 executes a compiler program 207 operating on (copies of) source code 208 (typically written in a high-level programming language) to produce executable code 209 for execution on processing system 100.

FIG. 3 is a diagram of an application instruction flow to which optimized performance/power dissipation execution is applied according to one embodiment of the present invention. Application code 300, compiled by processing system 200 for execution by processing system 100, includes a set of kernels or hardware loops 301a-301n selected, based on adopted profiling criteria, to improve the performance/power dissipation or an application with respect to execution by only the general-purpose processor 101.

Each kernel loop 301a-301n includes a set of iterations performing processing/manipulation on data structures stored in memory, either main memory, cache memory, or local memory to the coprocessor. The loop iterations 301a-301n present an iteration bandwidth (IBW, in bytes/iteration) data access requirement—that is, a certain number of machine words need to be loaded for scheduling processing operations to be performed and then continue with the next iteration until completion of the loop 301a-301n.

When compiling application code 300, compiler 207 automatically explores various scheduling possibilities for the instructions within application code 300 that target the fastest implementation based on a selected initiation interval (II, in cycles/iteration), starting from a minimum value. Additionally, coprocessor 102 is assumed to have a defined, statically computable available (data) bandwidth (ABW, in bytes/sec) to memory, a structural constraint imposed by the hardware resources (execution unit(s) 104) available within coprocessor 102 and by the communication mechanism 103 adopted to transmit data to and receive data from the processor 101.

Coprocessor 103 employs a clock divider 105 that may be configured by software as part of the coprocessor configuration to execute one of the selected kernel loops 301a-301n. The software-controlled digital clock generator 105 is a relatively simple digital circuit designed to support a limited number of frequency steps along a range up to a maximum coprocessor frequency CFMAX allowed by the coprocessor critical path. The use of digital clock generation circuitry rather than analog phase lock loops (PLLs) has the advantage of faster timing switching (one clock cycle versus microseconds). The optimal coprocessor clock rate for clock generation circuit 105 is derived by optimization algorithms 210 within compiler 207 to provide both performance and power dissipation savings.

FIG. 4 is a high level flowchart for a process of deriving an optimal coprocessor performance/power dissipation clock rate according to one embodiment of the present invention. The process 400 begins with selection of a kernel 301a-301n within the application code 300 for optimization of performance/power dissipation (step 401).

Each kernel loop 301a-301n is likely to present different performance requirements in terms of execution speed and data access bandwidth. The coprocessor 102 exploits the differences existing among the loop implementations to adapt the coprocessor operating frequency to the minimal needed to meet the kernel loop constraints.

The optimal performance/power dissipation coprocessor clock speed for the selected kernel is computed based on a model taking into account dependencies on both the loop data bandwidth requirements and the adopted compiler schedule for the application code 300. A software-controlled clock management circuit is employed to allow adaptation of the coprocessor operating frequency on the basis of the kernel loop implementation that is going to be executed.

First, IBW and ABW are determined for the loop under consideration (step 402). IBW may be computed by simply counting the number of load/store operations in an iteration, or by profiling information. In the simplest case, ABW may be considered constant and determined by the system architecture. However, ABW may vary across different loops and even across different invocations of the same loop, particularly if the coprocessor accesses memory through a cache subsystem. Therefore a more sophisticated approach consists of computing ABW analytically, based on the system architecture and loop characteristics, or from profiling information.

Second, given the constraints on the total available bandwidth ABW and required iteration bandwidth IBW, the coprocessor speed S, measured in iteration/seconds, is computed (step 403) as:

$$S=ABW/IBW.$$

The coprocessor speed S essentially expresses the maximum affordable number of iterations per second, from a data access perspective. This means that up to S iterations per second can be supported by the available coprocessor data delivery subsystems. A speed of S iterations/second implies that the data delivery subsystem is exploited at maximum performance, resulting in a 100% utilization factor.

The coprocessor speed S may be related to the initiation interval II explored by the compiler scheduler to define the operating clock frequency CF (step 404) in cycles/second as:

$$CF=II*S.$$

CF represents the frequency cycles needed to comply with the schedule and data constraints. CF represents the minimal clock frequency that the coprocessor has to execute to satisfy the performance constraints (data access and scheduling) for the loop execution, so that the processing resources do not represent a bottleneck in the coprocessor implementation of the loop.

A coprocessor frequency lower than CF would imply underutilization of the available data bandwidth, resulting in the coprocessor computing capacity becoming the bottleneck. A coprocessor frequency greater than CF means that the coprocessor datapath is underutilized because the bottleneck lies in the data delivery subsystem, already used at 100% of capacity. Therefore the extra frequency available in excess of CF is wasted, because this excess cannot be used to carry out other computations given the unavailability of extra data bandwidth.

If CF is lower then the maximum available execution frequency CFMAX, power savings can be obtained by adapting the coprocessor to run at this slower frequency, inherently gaining low power consumption and achieving the required performance. If CF is greater than the max-mum frequency CFMAX then correction action should be taken to lower the clock frequency CF. The clock speed S is reduced by increasing the iteration bandwidth IBW, which means that more access parallelism at the iteration is explored by unrolling the kernel loop with higher factors.

Accordingly, the compiler defines a new execution schedule and iteration internal II (step 406), and a new clock frequency CF is evaluated (steps 402-405) until CF≦CFMAX becomes valid. The clock frequency is then set to CF for the kernel loop being evaluated (step 407), or the closest lower frequency step supported by the clock generator, by insertion of an appropriate instruction in the executable code before the kernel loop. Thus the loop configuration bitstream for the kernel also includes information for the clock speed setting, which is passed to the clock generation circuit in the initialization stage, before starting the execution of the loop. The process then becomes idle (step 408) until the optimal performance/power dissipation clock rate for another kernel is evaluated.

A coprocessor frequency equal to CF represents an optimal operating frequency, producing a balanced system with full utilization of data bandwidth and coprocessor computing capacity. A requirement of a clock frequency greater than CFMAX may be addressed as a sub-optimal solution of a coprocessor the maximum frequency CFMAX, implying a 100% utilization of the coprocessor datapath and a sub-optimal utilization of the data bandwidth.

The present invention efficiently manages available coprocessor resources, targeting performance and power dissipation savings. At runtime, the coprocessor executes one among a set of kernel loops identified in the application, each likely to present different performance and power requirements. A coprocessor implementation targets performance speedup and lower power when compared to analogous loop execution on the general-purpose processor datapath and memory.

The coprocessor clock rate is adapted on the basis of data bandwidth and scheduling constraints for each kernel loop to be executed in the coprocessor. The optimal clock rate is derived by a compiler for each kernel loop in a manner suitable for inclusion in high-level compilation frameworks to provide feedback on the compiler-decided scheduling. The statically determined clock frequencies for each loop are enforced at runtime by a software-controlled clock.

As in the existing commercial solutions described above, clock frequency scaling is performed in the present invention at runtime, but the decision to scale is based on information gathered statically from high-level compilation technology. Therefore, no dynamic monitoring circuits are added to the processing system, resulting in less silicon area overhead for the frequency management. Power dissipation within a programmable processing system is reduced by executing each of multiple tasks executed in a coprocessor at a minimal clock frequency satisfying data bandwidth and schedule constraints.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:
1. A system comprising:
   a compiler configured to schedule a sequence of instructions for execution by an execution pipeline capable of operating at any of a plurality of operating frequencies for executing the instruction sequence using the execution pipeline and disposed within an execution unit con- figured to receive instructions and operand data from a processor configured to execute a program including the instruction sequence, the compiler configured to select one of the plurality of operating frequencies for executing the instruction sequence using the execution pipeline based upon performance and power dissipation resulting from executing the instruction sequence at the selected operating frequency, the compiler configured to insert an instruction into executable code containing the instruction sequence, the inserted instruction setting an operating frequency for the execution pipeline to the selected one of the plurality of operating frequencies.

2. The system according to claim 1, wherein the selected operating frequency is selected based upon one or more of a data transmission rate for data required by the instruction sequence and an instruction initiation interval set by a schedule defined for the instruction sequence.

3. The system according to claim 2, wherein, if the selected operating frequency is greater than a maximum operating frequency for the execution pipeline, the compiler is configured to define a different schedule for the instruction sequence and to select a different one of the plurality of operating frequencies.

4. The system according to claim 1, wherein the execution pipeline is configured to receive a clock signal from a software-controlled clock selectively generating the clock signal at one of a number of stepped frequencies below a maximum operating frequency of the execution pipeline.

5. The system according to claim 1, wherein, if the selected operating frequency is greater than a maximum operating frequency for the execution pipeline, the compiler is configured to define a different schedule for the instruction sequence and to select a different one of the plurality of operating frequencies.

6. The system according to claim 2, wherein a data transmission rate for data required by the instruction sequence is determined from a data rate at which data may be received by the execution pipeline and a data rate required for each iteration of a loop including the instruction sequence.

7. A method of improving performance/power dissipation comprising:

scheduling a sequence of instructions for execution by an execution pipeline capable of operating at any of a plurality of operating frequencies for executing the instruction sequence using the execution pipeline and disposed within an execution unit receiving instructions and operand data from a processor executing a program including the instruction sequence;

selecting one of the plurality of operating frequencies for executing the instruction sequence using the execution pipeline based upon performance and power dissipation resulting from executing the instruction sequence at the selected operating frequency; and inserting an instruction into executable code containing the instruction sequence, the inserted instruction setting an operating frequency for the execution pipeline to the selected one of the plurality of operating frequencies.

8. The method according to claim 7, wherein the selected operating frequency is selected based upon one or more of a data transmission rate for data required by the instruction sequence and an instruction initiation interval set by a schedule defined for the instruction sequence.

9. The method according to claim 8, wherein, if the selected operating frequency is greater than a maximum operating frequency for the execution pipeline, the compiler is configured to define a different schedule for the instruction sequence and to select a different one of the plurality of operating frequencies.

10. The method according to claim 7, wherein the execution pipeline receives a clock signal from a software-controlled clock selectively generating the clock signal at one of a number of stepped frequencies below a maximum operating frequency of the execution pipeline.

11. The method according to claim 7, wherein, if the selected operating frequency is greater than a maximum operating frequency for the execution pipeline, the compiler is configured to define a different schedule for the instruction sequence and to select a different one of the plurality of operating frequencies.

12. A processing system comprising:

an execution pipeline capable of operating at any of a plurality of operating frequencies for executing any instruction sequence using the execution pipeline, the execution pipeline configured to receive a first sequence of instruction and an instruction, created during compilation of source code for the first sequence of instructions, for selecting an operating frequency for the execution pipeline from the plurality of operating frequencies based upon performance and power dissipation resulting from executing the first sequence of instructions at one of the plurality of operating frequencies, the execution pipeline configured to execute the instruction and then operate at the selected operating frequency while executing the first sequence of instructions, wherein the execution pipeline is disposed within an execution unit configured to receive instructions and operand data from a processor configured to execute a program including the first sequence of instructions.

13. The system according to claim 12, wherein a data transmission rate for data required by the instruction sequence is determined from a data rate at which data may be received by the execution pipeline and a data rate required for each iteration of a loop including the first sequence of instructions.

14. The system according to claim 13, wherein a predefined number of iterations of the loop are scheduled.

15. The system according to claim 13, wherein an operating frequency for a software-controlled clock controlling the execution pipeline is set by the instruction and a clock signal is selectively generated by the execution pipeline at one of a number of stepped frequencies below a maximum operating frequency of the execution pipeline.

16. The system according to claim 15, wherein, if the selected operating frequency is greater than a maximum operating frequency for the execution pipeline, the compiler is configured to define a different schedule for the first sequence of instructions and to select a different one of the plurality of operating frequencies.

17. A method of operating a processing system comprising:

transmitting, to an execution pipeline capable of operating at any of a plurality of operating frequencies for executing any instruction sequence using the execution pipeline, a first sequence of instruction and an instruction, created during compilation of source code for the first sequence of instructions for selecting an operating frequency for the execution pipeline based upon performance and power dissipation resulting from executing the first sequence of instructions at one of the plurality of operating frequencies, wherein the instruction and instruction sequence are transmitted to an execution unit receiving instructions and operand data from a processor executing a program including the instruction sequence;

executing the instruction at the execution pipeline; and operating the execution pipeline at the selected operating frequency while executing the first sequence of instructions in the execution pipeline.

18. The system according to claim 17, wherein a data transmission rate for data required by the first sequence of instructions is determined from a data rate at which data may be received by the execution pipeline and a data rate required for each iteration of a loop including the instruction sequence.

19. The system according to claim 18, wherein a predefined number of iterations of the loop are scheduled.

20. The system according to claim 18, wherein an operating frequency for a software-controlled clock controlling the execution pipeline is set by the instruction and a clock signal is selectively generated by the execution pipeline at one of a number of stepped frequencies below a maximum operating frequency of the execution pipeline.

* * * * *